United States Patent
Kumar et al.

(10) Patent No.: US 8,887,808 B2
(45) Date of Patent: *Nov. 18, 2014

(54) ENGINEERED METHODS AND MATERIALS FOR WELLBORE STRENGTHENING IN SUBTERRANEAN OPERATIONS

(75) Inventors: Arunesh Kumar, Muzaffarpur (IN); Sharath Savari, Hyderabad (IN); Donald L. Whitfill, Kingwood, TX (US); Dale E. Jamison, Humble, TX (US)

(73) Assignee: Halliburton Energy Services, Inc., Houston, TX (US)

(*) Notice: Subject to any disclaimer, the term of this patent is extended or adjusted under 35 U.S.C. 154(b) by 207 days.

This patent is subject to a terminal disclaimer.

(21) Appl. No.: 13/292,516

(22) Filed: Nov. 9, 2011

(65) Prior Publication Data
US 2013/0112414 A1    May 9, 2013

(51) Int. Cl.
E21B 33/13    (2006.01)
E21B 43/22    (2006.01)
C09K 8/03    (2006.01)
C09K 8/516    (2006.01)

(52) U.S. Cl.
CPC ............ C09K 8/03 (2013.01); C09K 2208/08 (2013.01); C09K 8/516 (2013.01)
USPC ........ 166/293; 166/276; 166/278; 166/280.1; 166/300

(58) Field of Classification Search
None
See application file for complete search history.

(56) References Cited

U.S. PATENT DOCUMENTS

| | | | |
|---|---|---|---|
| 4,439,328 A | 3/1984 | Moity | |
| 5,905,061 A | 5/1999 | Patel | |
| 5,977,031 A | 11/1999 | Patel | |
| 6,828,279 B2 | 12/2004 | Patel et al. | |
| 7,284,611 B2 | 10/2007 | Reddy et al. | |
| 7,507,692 B2 | 3/2009 | Xiang | |
| 7,696,131 B2 | 4/2010 | Oyler et al. | |
| 7,776,797 B2 | 8/2010 | Allin et al. | |
| 2005/0170973 A1 | 8/2005 | Verret | |
| 2007/0017676 A1 | 1/2007 | Reddy et al. | |
| 2009/0099047 A1* | 4/2009 | Cunningham et al. | 507/207 |
| 2009/0137431 A1 | 5/2009 | Reddy et al. | |
| 2009/0286697 A1* | 11/2009 | Shaarpour | 507/104 |
| 2010/0152070 A1 | 6/2010 | Ghassemzadeh | |

FOREIGN PATENT DOCUMENTS

| | | |
|---|---|---|
| WO | WO 2010/088484 A2 | 8/2010 |
| WO | WO 2010/088484 A3 | 8/2010 |
| WO | 2010/133302 A1 | 11/2010 |
| WO | 2013070357 A2 | 5/2013 |

OTHER PUBLICATIONS

Growcock et al., "Drilling Fluid Maintenance During Continuous Wellbore Strengthening Treatment," American Association of Drilling Engineers, 2010 AADE Fluids Conference and Exhibition held in Houston, Texas on Apr. 6-7, 2010, AADE-10-DF-HO-44.

(Continued)

*Primary Examiner* — Zakiya W Bates
(74) *Attorney, Agent, or Firm* — McDermott Will & Emery LLP; Holly Soehnge

(57) ABSTRACT

A method of wellbore strengthening may include providing a wellbore strengthening fluid comprising a drilling fluid, a particulate, and a fiber; introducing the wellbore strengthening fluid into a wellbore penetrating a subterranean formation; and forming a plug comprising the particulate and the fiber in a void near the wellbore, the plug being capable of maintaining integrity at about 1000 psi or greater overbalance pressure.

7 Claims, 6 Drawing Sheets

(56) References Cited

OTHER PUBLICATIONS

Van Vliet et al., "Development and Field Use of Fibre-Containing Cement," Offshore Technology Conference, 1995, OTC 7889.

Kumar et al., "Wellbore Strengthening: The Less-Studied Properties of Lost-Circulation Materials," Society of Petroleum Engineers, SPE Annual Technical Conference held in Florence, Italy, Sep. 2010, SPE 133484.

Kefi, et al., "Optimizing in Four Steps Composite Lost-Circulation Pills Without Knowing Loss Zone Width," IADC/SPE Asia Pacific Drilling Technology Conference held in Ho Chi Minh City, Vietnam, Nov. 2010, IADC/SPE 133735.

Savari, et al., "Engineered Insight into 'Unexplored' Lost Circulation Material (LCM) Properties Corroborating Wellbore Strengthening Phenomenon," IORS 2010.

International Search Report and Written Opinion for PCT/US2012/059196 dated Mar. 18, 2014.

\* cited by examiner

ENGINEERED METHODS AND MATERIALS FOR WELLBORE STRENGTHENING IN SUBTERRANEAN OPERATIONS

BACKGROUND

The present invention relates to compositions and methods related to plugging near-wellbore voids for wellbore strengthening.

Lost circulation is one of the larger contributors to drilling non-productive time. Lost circulation arises from drilling fluid leaking into the formation via undesired flow paths, e.g., permeable sections, natural fractures, and induced fractures. Lost circulation treatments or pills may be used to remediate the wellbore by plugging the fractures before drilling can resume.

Drilling is performed with an overbalance pressure such that the wellbore pressure is maintained within the mud weight window, i.e., the area between the pore pressure and the fracture pressure, see FIG. 1. The term "overbalance pressure," as used herein, refers to the amount of pressure in the wellbore that exceeds the pore pressure. The term "pore pressure," as used herein, refers to the pressure of fluids in the formation. Overbalance pressure is needed to prevent reservoir fluids from entering the wellbore. The term "fracture pressure," as used herein, refers to the pressure threshold where pressures exerted in excess of the threshold from the wellbore onto the formation that will cause one or more fractures in the subterranean formation. Wider mud weight windows allow for drilling with a reduced risk of lost circulation.

In traditional subterranean formations, the mud weight window may be wide, FIG. 1. However, in formations having problematic zones, e.g., depleted zones, high-permeability zones, highly tectonic areas with high in-situ stresses, or pressurized shale zones below salt layers, the mud weight window may be narrower and more variable, FIG. 2. When the overbalance pressure exceeds the fracture pressure, a fracture will be induced and lost circulation may occur. One proactive method to reducing the risk of lost circulation is to strengthen or stabilize the wellbore through the use of particulate wellbore strengthening materials. Wellbore strengthening involves inducing fractures while simultaneously plugging the fractures. This simultaneous fracture-plug method increases the compressive tangential stress in the near-wellbore region of the subterranean formation which translates to an increase in the fracture pressure thereby widening the mud weight window, FIG. 3. The extent of wellbore strengthening, i.e., expansion of the mud weight window, is dependent on the overbalance pressure the plug can withstand before failing, i.e., the plug-break pressure. If the plug fails, lost circulation and drilling non-productive time results.

SUMMARY OF THE INVENTION

The present invention relates to compositions and methods related to plugging near-wellbore voids for wellbore strengthening.

In some embodiments, the present invention provides a method of wellbore strengthening that comprises providing a wellbore strengthening fluid comprising a drilling fluid, a particulate, and a fiber; introducing the wellbore strengthening fluid into a wellbore penetrating a subterranean formation; and forming a plug comprising the particulate and the fiber in a void near the wellbore, the plug being capable of maintaining integrity at about 1000 psi or greater overbalance pressure.

In some embodiments, the present invention provides a method of drilling a wellbore that comprises introducing a pill comprising a wellbore strengthening fluid that comprises a first drilling fluid, a particulate, and a fiber into a section of a wellbore penetrating a subterranean formation; forming a plug comprising the particulate and the fiber in a void near the wellbore, the plug having a plug breaking pressure of greater than about 1000 psi thereby yielding a strengthened wellbore section; and passing a second drilling fluid through the strengthened wellbore section.

In some embodiments, the present invention provides a wellbore strengthening fluid that comprises a drilling fluid, a particulate, and a fiber capable of forming a plug with a plug breaking pressure greater than about 1000 psi.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present invention relates to compositions and methods related to plugging near-wellbore voids for wellbore strengthening.

The present invention provides wellbore strengthening fluids and methods that may expand the mud weight window. In some embodiments, the plugs formed may maintain their integrity with an overbalance pressure greater than about 1000 psi, 1500 psi, or 2000 psi. As used herein, the term "maintain integrity," and derivatives thereof, with respect to plugs refers to the ability of a plug to maintain drilling fluid loss control and does not imply that the structure of the plug is unchanged. The expansion of the mud weight window allows for the reduced risk of lost circulation occurring while using higher weight drilling fluids.

Further, wellbore strengthening fluids and methods described herein provide for the use of higher rheology fluids thereby reducing the need to change mud systems within a drilling operation. Also, wellbore strengthening fluids and methods described herein reduce the need for zonal isolation with casing string. Both of these advantageously reduce the time and cost of drilling operations.

It should be noted that when "about" is provided at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

In some embodiments, a wellbore strengthening fluid may comprise, consist essentially of, or consist of a drilling fluid, a particulate, and a fiber. In some embodiments, a plug may form in a void near the wellbore, the plug comprising, consisting essentially of, or consisting of a particulate and a fiber. In some embodiments, the void may be natural and/or man-made. In some embodiments, the void may be an incipient fracture. In some embodiments, the plug may impede the propagation of an incipient fracture. In some embodiments, the plug may shield the tip of an incipient fracture from the overbalance pressure of the wellbore. In some embodiments, a plug may be capable of maintaining integrity with about 500 psi or greater, about 1000 psi or greater, or about 1500 psi or greater overbalance pressure. In some embodiments, the overbalance pressure may range from a lower limit of about 500 psi, 750 psi, 1000 psi, or 1250 psi to an upper limit of about 2500 psi, 2000 psi, 1750 psi, 1500 psi, or 1250 psi, and wherein the overbalance pressure may range from any lower limit to any upper limit and encompass any subset therebetween.

Figure 1:
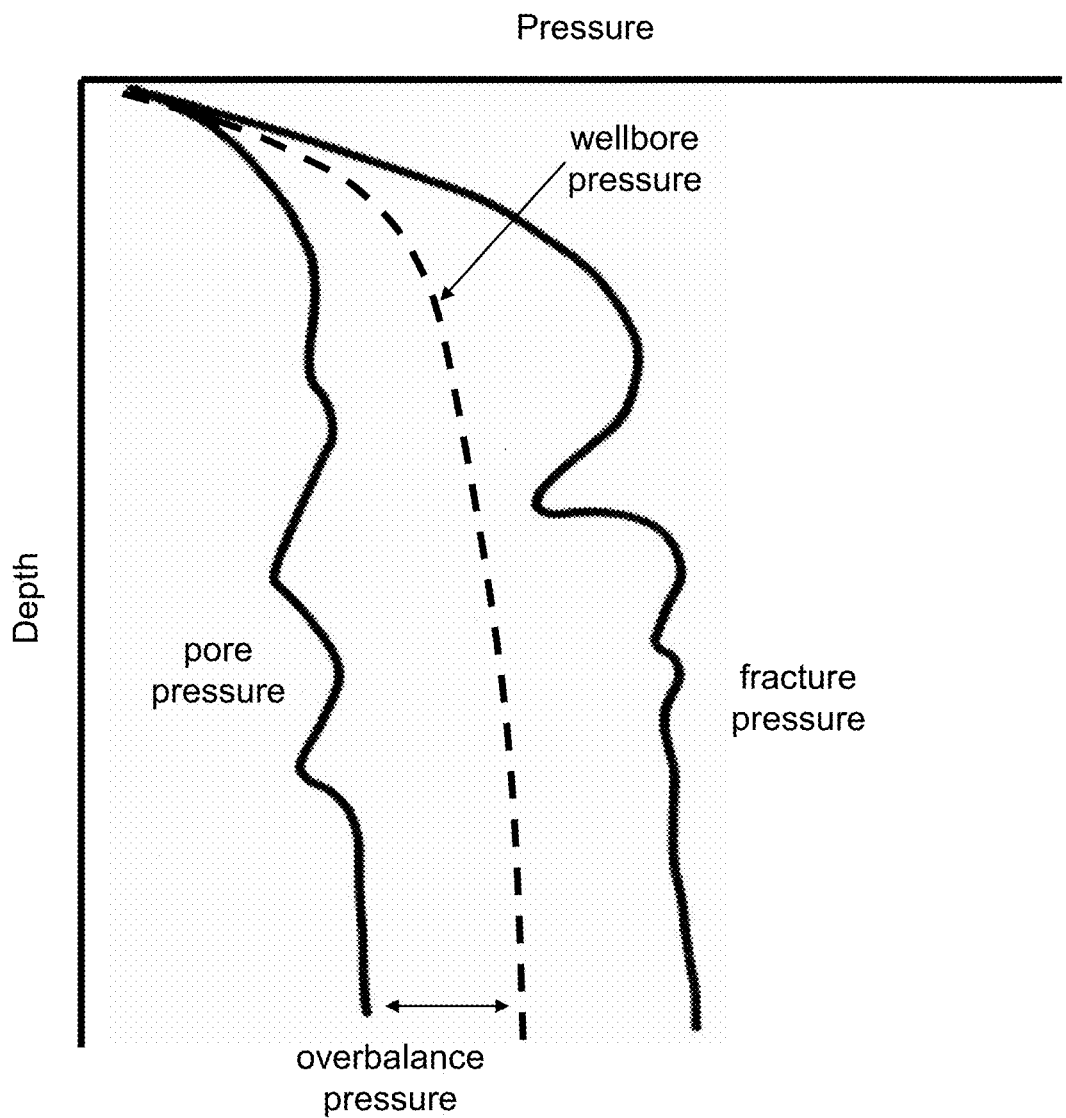
FIG. 1 illustrates the mud weight window for a traditional wellbore.
Figure 2:
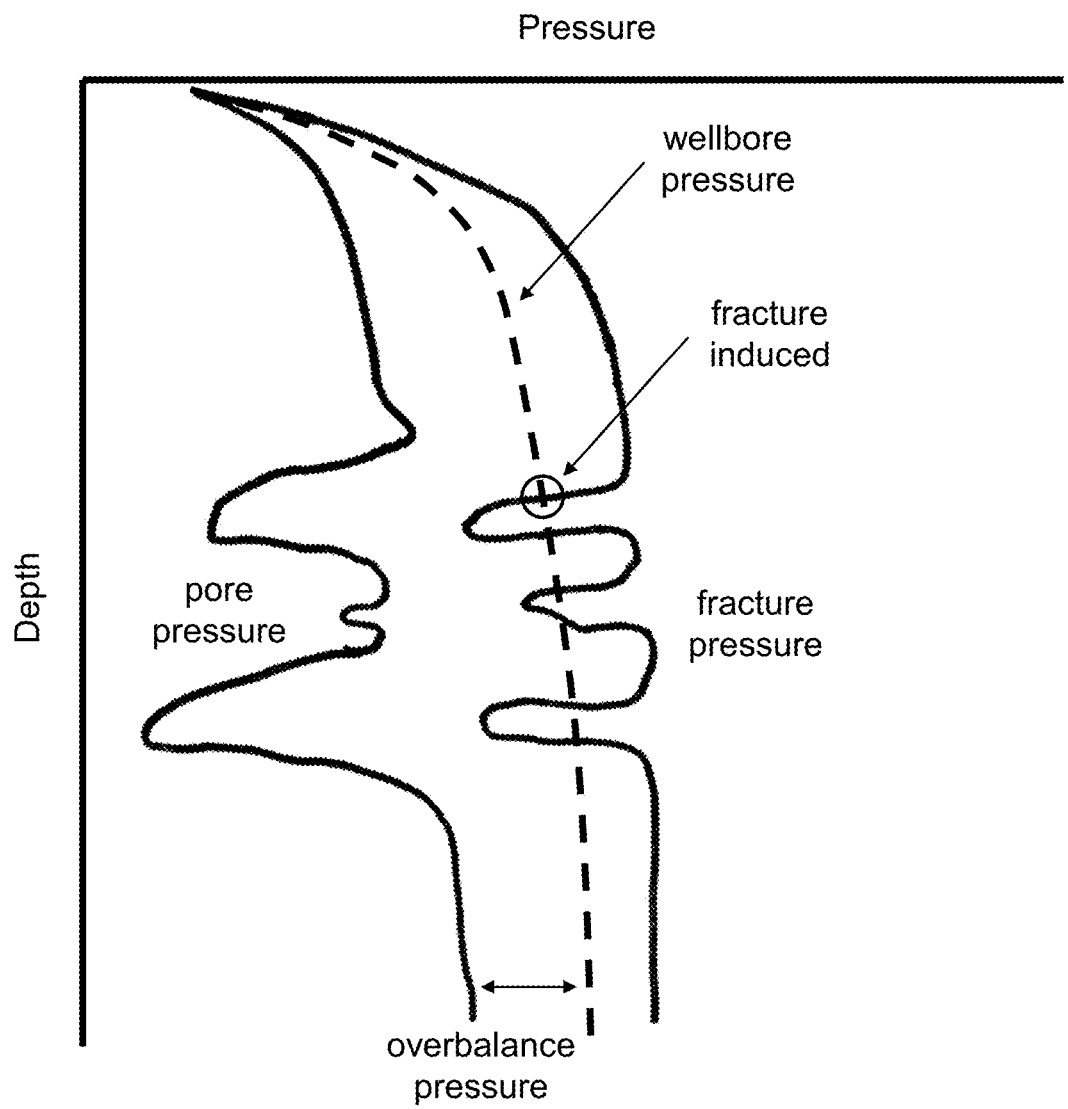
FIG. 2 illustrates the mud weight window for a problematic wellbore.
Figure 3:
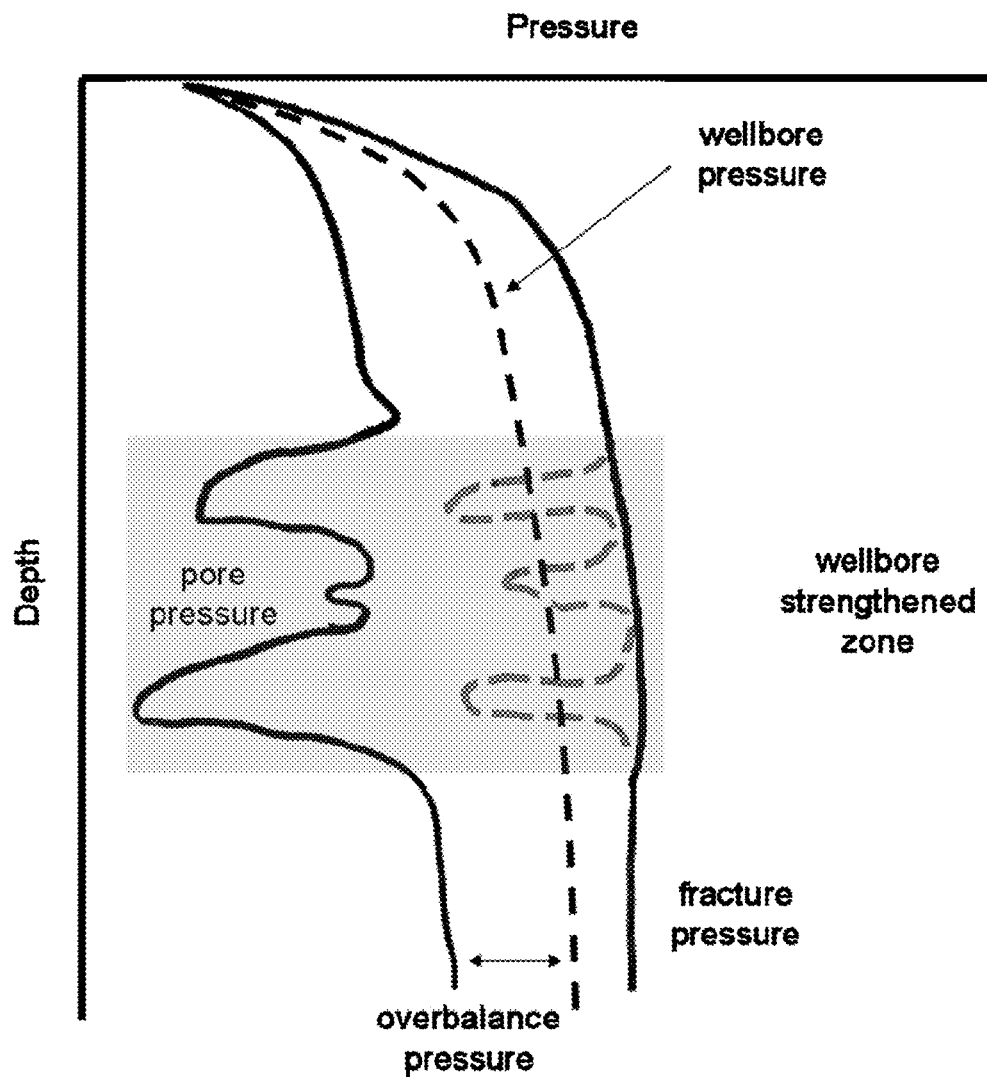
FIG. 3 illustrates the mud weight window for a strengthened wellbore.
Figure 4:
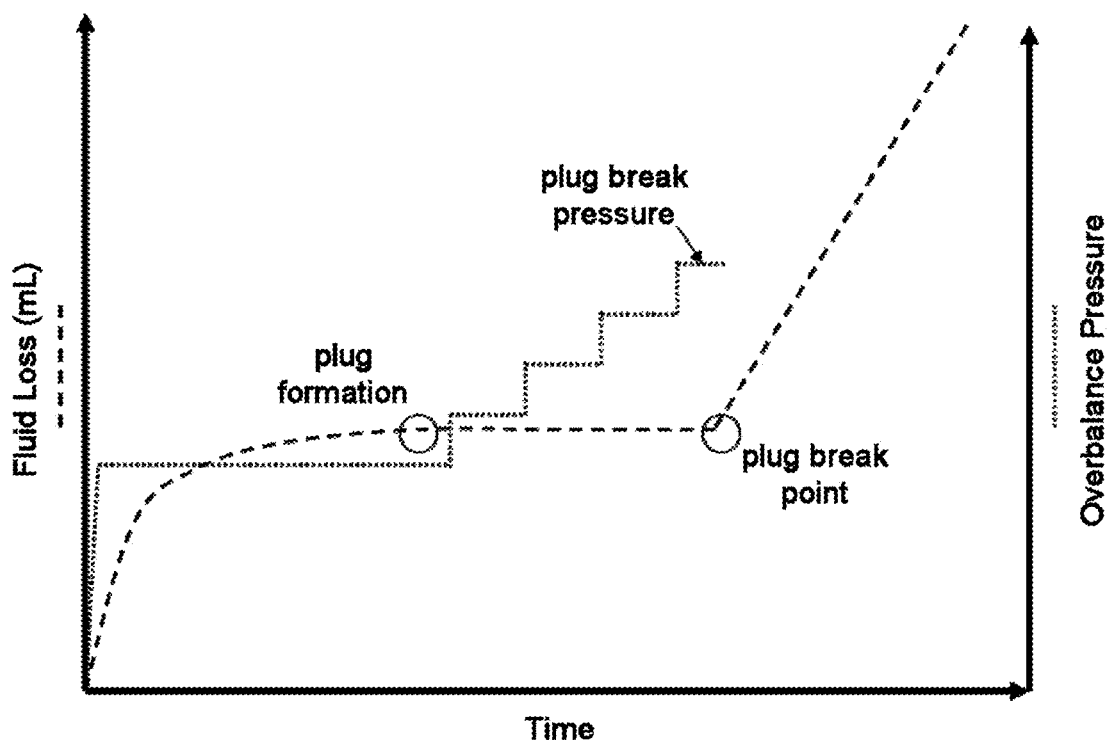
FIG. 4 illustrates the Plug Breaking Pressure test methodology.
Figure 5A:
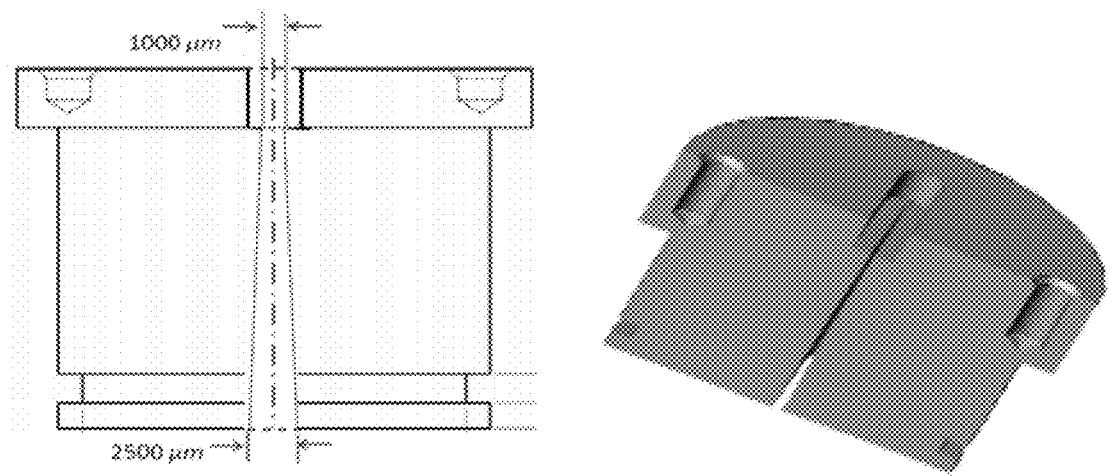
FIGS. 5A-B provide nonlimiting representations of the Particle Plugging Apparatus and Tapered Cell, not necessarily to scale.
Figure 5B:
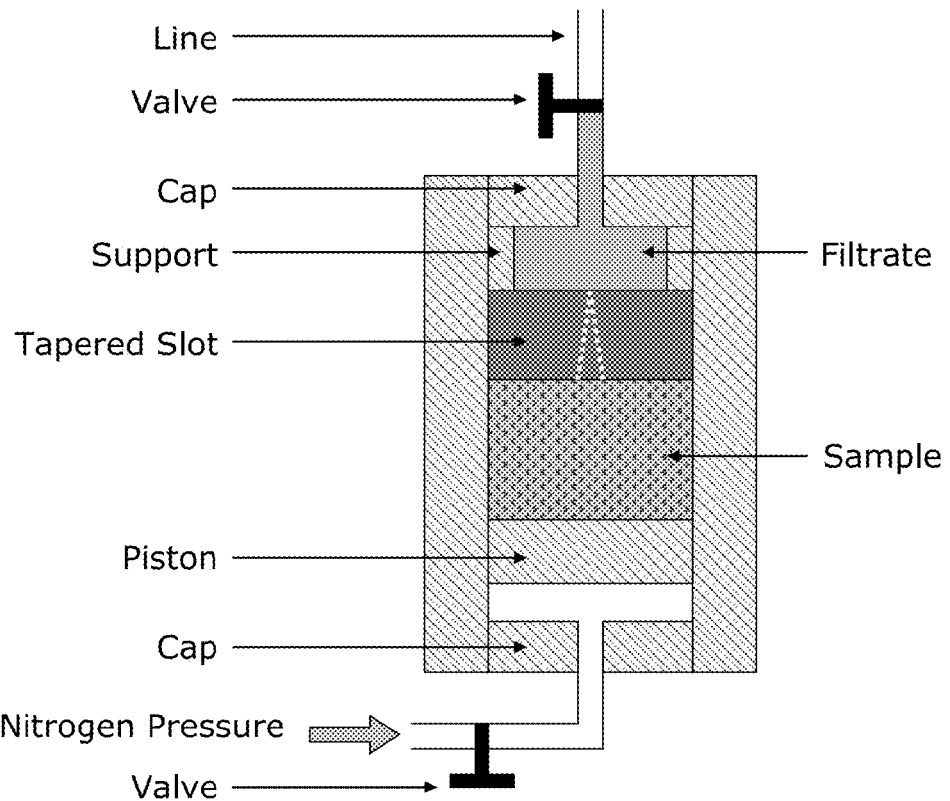

In some embodiments, the pressure increase over overbalance pressure of a particle and fiber combination may be tested via a Plug Breaking Pressure Test using a Particle Plugging Apparatus (FIG. 5B). A Particle Plugging Apparatus comprises a 500-mL volume cell having a movable piston at the bottom and an assembly for sealing the filter media in while testing at the top. The wellbore strengthening fluid with the particulate(s) and fiber(s) to be tested is loaded into the cell. The cell is positioned with pressure applied from the bottom of the cell and the filtrate collected from the top. This may help prevent other components of the wellbore strengthening fluid that settle during the static test from contributing to the performance of the particulate and fiber. Pressure, applied by a two-stage hydraulic pump or using a nitrogen pressure line, is transferred to the wellbore strengthening fluid through the floating piston in the cell so as to maintain a differential pressure of about 500 psi. The filter media employed in the Plug Breaking Pressure Test is a tapered slot (FIG. 5A). Once a plug is formed in the tapered slot, the tapered slot is carefully transferred without disturbing the plug therein from the Particle Plugging Apparatus to a second Particle Plugging Apparatus with a clear drilling fluid, i.e., not containing the particle(s) and fiber(s) being tested. Pressure is applied from the bottom, as described above, in 100 psi intervals. The plug break pressure is the pressure at which the plug allows drilling fluid to pass through the tapered slot. The methodology for determining the plug breaking pressure is illustrated in FIG. 4. It should be noted that as described above, the Plug Pressure Test involves transferring the tapered slot after a plug is formed. It should be noted that a Particle Plugging Apparatus and associated methods can be designed so that the Plug Pressure Test occurs without the need for transferring the tapered slot.

The particulate and/or fiber may be natural or synthetic, degradable or nondegradable, and mixtures thereof. It should be understood that the term "particulate" or "particle," as used herein, includes all known shapes of materials, including substantially spherical materials, crenulated materials, low aspect ratio materials, polygonal materials (such as cubic materials), discus, hybrids thereof, and any combination thereof. It should be understood that the term "fiber," as used herein, includes all known shapes of materials with medium to high aspect ratios, including filaments and collections of filaments. In some embodiments, the aspect ratio of a fiber may range from a lower limit of about 5, 10, or 25 to an unlimited upper limit. While the aspect ratio upper limit is believed to be unlimited, the aspect ratio of applicable fibers may range from a lower limit of about 5, 10, or 25 to an upper limit of about 10,000, 5000, 1000, 500, or 100, and wherein the aspect ratio may range from any lower limit to any upper limit and encompass any subset therebetween. In some embodiments, the length of a fiber may range from a lower limit of about 150, 250, 500, or 1000 microns to an upper limit of about 6000, 5000, 2500, or 1000, and wherein the fiber length may range from any lower limit to any upper limit and encompass any subset therebetween. Fibers may be swellable, i.e., increase in volume by absorbing solvent. Fibers may be aggregates of filaments where the aggregate may or may not have a medium to high aspect ratio.

In some embodiments, at least one particulate may be used in combination with at least one fiber in a wellbore strengthening fluid. Suitable particulates and/or fiber may include those comprising materials suitable for use in a subterranean formation including, but not limited to, any known lost circulation material, bridging agent, fluid loss control agent, diverting agent, plugging agent, and the like, and any combination thereof. Examples of suitable materials may include, but not be limited to, sand, shale, ground marble, bauxite, ceramic materials, glass materials, metal pellets, high strength synthetic fibers, resilient graphitic carbon, cellulose flakes, wood, resins, polymer materials (crosslinked or otherwise), polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, composite materials, and any combination thereof. Suitable composite materials may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and any combination thereof.

In some embodiments, particulates and/or fibers may comprise a degradable material. Nonlimiting examples of suitable degradable materials that may be used in the present invention include, but are not limited to, degradable polymers (crosslinked or otherwise), dehydrated compounds, and/or mixtures of the two. In choosing the appropriate degradable material, one should consider the degradation products that will result. As for degradable polymers, a polymer is considered to be "degradable" herein if the degradation is due to, inter alia, chemical and/or radical process such as hydrolysis, oxidation, enzymatic degradation, or UV radiation. Suitable examples of degradable polymers for a lost circulation material for use in the present invention that may be used include, but are not limited to, those described in the publication of Advances in Polymer Science, Vol. 157 entitled "Degradable Aliphatic Polyesters" edited by A. C. Albertsson. Polymers may be homopolymers, random, linear, crosslinked, block, graft, and star- and hyper-branched. Such suitable polymers may be prepared by polycondensation reactions, ring-opening polymerizations, free radical polymerizations, anionic polymerizations, carbocationic polymerizations, and coordinative ring-opening polymerization, and any other suitable process. Specific examples of suitable polymers include polysaccharides such as dextran or cellulose; chitin; chitosan; proteins; orthoesters; aliphatic polyesters; poly(lactide); poly (glycolide); poly($\in$-caprolactone); poly(hydroxybutyrate); poly(anhydrides); aliphatic polycarbonates; poly(orthoethers); poly(amino acids); poly(ethylene oxide); polyphosphazenes; and any combination thereof. Of these suitable polymers, aliphatic polyesters and polyanhydrides are preferred. Dehydrated compounds may be used in accordance with the present invention as a degradable solid particulate. A dehydrated compound is suitable for use in the present invention if it will degrade over time as it is rehydrated. For example, particulate solid anhydrous borate material that degrades over time may be suitable. Specific examples of particulate solid anhydrous borate materials that may be used include, but are not limited to, anhydrous sodium tetraborate (also known as anhydrous borax) and anhydrous boric acid. Degradable materials may also be combined or blended. One example of a suitable blend of materials is a mixture of poly(lactic acid) and sodium borate where the mixing of an acid and base could result in a neutral solution where this is desirable. Another example would include a blend of poly(lactic acid) and boric oxide, a blend of calcium carbonate and poly(lactic) acid, a blend of magnesium oxide and poly(lactic) acid, and the like. In certain preferred embodiments, the degradable material is calcium carbonate plus poly(lactic) acid. Where a mixture including poly(lactic) acid is used, in certain preferred embodiments the poly(lactic) acid is present in the mixture in a stoichiometric amount, e.g., where a mixture of calcium carbonate and poly(lactic) acid is used, the mixture comprises two poly(lactic) acid units for each calcium carbonate unit. Other blends that undergo an irreversible degradation may also be suitable, if the products of the degradation do not undesirably interfere with either the conductivity of the filter cake or with the production of any of the fluids from the subterranean formation.

Specific examples of suitable particulates may include, but not be limited to, BARACARB® particulates (ground marble, available from Halliburton Energy Services, Inc.) including BARACARB® 5, BARACARB® 25, BARACARB® 150, BARACARB® 600, BARACARB® 1200; STEELSEAL® particulates (resilient graphitic carbon, available from Halliburton Energy Services, Inc.) including STEELSEAL® powder, STEELSEAL® 50, STEELSEAL® 150, STEELSEAL® 400 and STEELSEAL® 1000; WALL-NUT® particulates (ground walnut shells, available from Halliburton Energy Services, Inc.) including WALL-NUT® M, WALL-NUT® coarse, WALL-NUT® medium, and WALL-NUT® fine; BARAPLUG® (sized salt water, available from Halliburton Energy Services, Inc.) including BARAPLUG® 20, BARAPLUG® 50, and BARAPLUG® 3/300; BARAFLAKE® (calcium carbonate and polymers, available from Halliburton Energy Services, Inc.); and the like; and any combination thereof.

Further examples of suitable fibers may include, but not be limited to, fibers of cellulose including viscose cellulosic fibers, oil coated cellulosic fibers, and fibers derived from a plant product like paper fibers; carbon including carbon fibers; melt-processed inorganic fibers including basalt fibers, woolastonite fibers, non-amorphous metallic fibers, metal oxide fibers, mixed metal oxide fibers, ceramic fibers, and glass fibers; polymeric fibers including polypropylene fibers and poly(acrylic nitrile) fibers; metal oxide fibers; mixed metal oxide fibers; and the like; and any combination thereof. Examples may also include, but not be limited to, PAN fibers, i.e., carbon fibers derived from poly(acrylonitrile); PANEX® fibers (carbon fibers, available from Zoltek) including PANEX® 32, PANEX® 35-0.125", and PANEX® 35-0.25"; PANOX® (oxidized PAN fibers, available from SGL Group); rayon fibers including BDF™ 456 (rayon fibers, available from Halliburton Energy Services, Inc.); poly(lactide) ("PLA") fibers; alumina fibers; cellulosic fibers; BAROFIBRE® fibers including BAROFIBRE® and BAROFIBRE® C (cellulosic fiber, available from Halliburton Energy Services, Inc.); and the like; and any combination thereof.

In some embodiments, a wellbore strengthening fluid may comprise a drilling fluid, a particulate, and a fiber. In some embodiments, the concentration of a particulate in a wellbore strengthening fluid may range from a lower limit about 0.01 pounds per barrel ("PPB"), 0.05 PPB, 0.1 PPB, 0.5 PPB, 1 PPB, 3 PPB, 5 PPB, 10 PPB, 25 PPB, or 50 PPB to an upper limit about 150 PPB, 100 PPB, 75 PPB, 50 PPB, 25 PPB, 10 PPB, 5 PPB, 4 PPB, 3 PPB, 2 PPB, 1 PPB, or 0.5 PPB, and wherein the particulate concentration may range from any lower limit to any upper limit and encompass any subset therebetween. In some embodiments, the concentration of a fiber in a wellbore strengthening fluid may range from a lower limit about 0.01 PPB, 0.05 PPB, 0.1 PPB, 0.5 PPB, 1 PPB, 3 PPB, 5 PPB, or 10 PPB to an upper limit about 120 PPB, 100 PPB, 75 PPB, 50 PPB, 20 PPB, 10 PPB, 5 PPB, 4 PPB, 3 PPB, 2 PPB, 1 PPB, or 0.5 PPB, and wherein the fiber concentration may range from any lower limit to any upper limit and encompass any subset therebetween. One skilled in the art, with the benefit of this disclosure, should understand that the concentrations of the particulate(s) and/or fiber(s) can effect the viscosity of the wellbore strengthening fluid, and therefore should be adjusted to ensure proper delivery of said particulate(s) and/or fiber(s) into the wellbore.

Suitable drilling fluids may comprise oil-based fluids, aqueous-based fluids, aqueous-miscible fluids, water-in-oil emulsions, or oil-in-water emulsions. Suitable oil-based fluids may include alkanes, olefins, aromatic organic compounds, cyclic alkanes, paraffins, diesel fluids, mineral oils, desulfurized hydrogenated kerosenes, and any combination thereof. Suitable aqueous-based fluids may include fresh water, saltwater (e.g., water containing one or more salts dissolved therein), brine (e.g., saturated salt water), seawater, and any combination thereof. Suitable aqueous-miscible fluids may include, but not be limited to, alcohols, e.g., methanol, ethanol, n-propanol, isopropanol, n-butanol, sec-butanol, isobutanol, and t-butanol; glycerins; glycols, e.g., polyglycols, propylene glycol, and ethylene glycol; polyglycol amines; polyols; any derivative thereof; any in combination with salts, e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, potassium carbonate, and any combination thereof; any in combination with an aqueous-based fluid; and any combination thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base treatment fluid, where the amount may range from any lower limit to any upper limit and encompass any subset therebetween. Examples of suitable invert emulsions include those disclosed in U.S. Pat. Nos. 5,905,061, 5,977,031, and 6,828,279, each of which are incorporated herein by reference. It should be noted that for water-in-oil and oil-in-water emulsions, any mixture of the above may be used including the water being an aqueous-miscible fluid.

In some embodiments, a drilling fluid may optionally comprise a polar organic molecule. Polar organic molecules may be any molecule with a dielectric constant greater than about 2. Polar organic molecules suitable for use in the present invention may include any polar organic molecule including protic and aprotic organic molecules. Suitable protic molecules may include, but not be limited to, organic molecules with at least one functional group to include alcohols, aldehydes, acids, amines, amides, thiols, and any combination thereof. Suitable aprotic molecules may include, but not be limited to, organic molecules with at least one functional group to include esters, ethers, nitrites, nitriles, ketones, sulfoxides, halogens, and any combination thereof. Suitable polar organic molecules may be cyclic compound including, but not limited to, pyrrole, pyridine, furan, any derivative thereof, and any combination thereof. Suitable polar organic molecules may include an organic molecule with multiple functional groups including mixtures of protic and aprotic groups. In some embodiments, a drilling fluid may comprise multiple polar organic molecules. In some embodiments, a polar organic molecule may be present in a drilling fluid in an amount from a lower limit about 0.01%, 0.1%, 0.5%, 1%, 5%, or 10% to an upper limit about 100%, 90%, 75%, 50%, 25%, 20%, 15%, 10%, 5%, 1%, 0.5%, or 0.1% by volume of the drilling fluid, and wherein the polar organic molecule concentration may range from any lower limit to any upper limit and encompass any subset therebetween.

In some embodiments, other additives may optionally be included in the wellbore strengthening fluid and/or drilling fluid. Examples of such additives may include, but are not limited to, salts; weighting agents; inert solids; fluid loss control agents; emulsifiers; dispersion aids; corrosion inhibitors; emulsion thinners; emulsion thickeners; viscosifying agents; high-pressure, high-temperature emulsifier-filtration control agents; surfactants; particulates; proppants; lost circulation materials; pH control additives; foaming agents; breakers; biocides; crosslinkers; stabilizers; chelating agents; scale inhibitors; gas; mutual solvents; oxidizers; reducers; and any combination thereof. A person of ordinary skill in the art, with the benefit of this disclosure, will recognize when an additive should be included in a wellbore strengthening fluid and/or drilling fluid, as well as an appropriate amount of said additive to include.

The wellbore strengthening fluid, according to any embodiment described herein, may be used in full-scale operations or pills. As used herein, a "pill" is a type of relatively small volume of specially prepared treatment fluid placed or circulated in the wellbore.

Some embodiments may involve introducing a wellbore strengthening fluid into at least a portion of a wellbore penetrating a subterranean formation. Some embodiments may involve introducing a wellbore strengthening fluid into a portion of a wellbore penetrating a subterranean formation so as to produce a strengthened wellbore section.

Some embodiments may involve drilling at least a portion of a wellbore penetrating a subterranean formation with a drilling fluid. Drilling may occur before, after, and/or during a wellbore strengthening treatment, i.e., introduction of a wellbore strengthening fluid. In some embodiments, the drilling fluid and the drilling fluid of the wellbore strengthening fluid may have the same or different compositions and/or the same or different characteristics, e.g., density and/or weight. In some embodiments, the drilling fluid used before wellbore strengthening and after wellbore strengthening may have the same or different compositions and/or the same or different characteristics, e.g., density and/or weight. Some embodiments may involve substantially removing, e.g., flushing, the wellbore strengthening fluid from the wellbore before drilling operations resume.

In some embodiments, a drilling fluid used after wellbore strengthening may have an increased equivalent circulating density relative to a drilling fluid used before wellbore strengthening. Equivalent circulating density, as used herein, refers to the effective density exerted by a circulating fluid against a formation that takes into account the pressure drop in the annulus about the point being considered. Equivalent circulating density may be effected by various parameter including, but not limited to, the viscosity of the drilling fluid, the pump rate, the drilling fluid weight, the annulus size, and any combination thereof.

Wellbore strengthening increases the near wellbore stresses which may allow for a higher mud weight window to be sustained.

In some embodiments, a drilling fluid used after wellbore strengthening may have an increased drilling fluid weight relative to a drilling fluid used before wellbore strengthening. In some embodiments, the drilling fluid weight may range from drilling fluid weights corresponding to about the pore pressure to drilling fluid weights corresponding to about the fracture pressure. In some embodiments, the drilling fluid weights corresponding to pore pressure may range from about 2 ppg (pounds per gallon) to about 10 ppg. The drilling fluid weights corresponding to fracture pressure can be determined with a leak off test, which is commonly known to one skilled in the art, when performed to determine the maximum pressure a formation can sustain.

Some embodiments may involve introducing a wellbore strengthening fluid into a wellbore penetrating a subterranean formation; and forming a plug comprising the particulate and the fiber in a void near the wellbore, the plug being capable of maintaining integrity at about 1000 psi or greater overbalance pressure. Generally the wellbore strengthening fluid may include a drilling fluid, a particulate, and a fiber.

Some embodiments may involve introducing a pill comprising a wellbore strengthening fluid that comprises a first drilling fluid, a particulate, and a fiber into a section of a wellbore penetrating a subterranean formation; forming a plug comprising the particulate and the fiber in a void near the wellbore, the plug having a plug breaking pressure of greater than about 1000 psi thereby yielding a strengthened wellbore section; and passing a second drilling fluid through the strengthened wellbore section.

In some embodiments, a wellbore strengthening fluid may generally include a drilling fluid, a particulate, and a fiber capable of forming a plug with a plug breaking pressure greater than about 1000 psi.

To facilitate a better understanding of the present invention, the following examples of preferred embodiments are given. In no way should the following examples be read to limit, or to define, the scope of the invention.

EXAMPLES

Plug Breaking Pressure (PBP) Test. A Particle Plugging Apparatus, shown in FIG. 5B, comprises a 500-mL volume cell having a movable piston at the bottom and an assembly for sealing the filter media in while testing at the top. The wellbore strengthening fluid with the particulate(s) and fiber(s) to be tested is loaded into the cell. The cell is positioned with pressure applied from the bottom of the cell and the filtrate collected from the top. This may help prevent other components of the wellbore strengthening fluid that settle during the static test from contributing to the performance of the particulate and fiber. Pressure, applied by a two-stage hydraulic pump or using a nitrogen pressure line, is transferred to the wellbore strengthening fluid through the floating piston in the cell so as to maintain a differential pressure of about 500 psi. The filter media employed in the Plug Breaking Pressure Test is a tapered slot (FIG. 5A). Once a plug is formed in the tapered slot, the tapered slot is carefully transferred without disturbing the plug therein from the Particle Plugging Apparatus to a second Particle Plugging Apparatus with a clear drilling fluid, i.e., not containing the particle(s) and fiber(s) being tested. Pressure is applied from the bottom, as described above, in 100 psi intervals. This pressure is equivalent to the overbalance pressure that would be experienced in a wellbore. The plug break pressure is the pressure at which the plug allows drilling fluid to pass through the tapered slot. The methodology for determining the plug breaking pressure is illustrated in FIG. 4.

Figure 6:
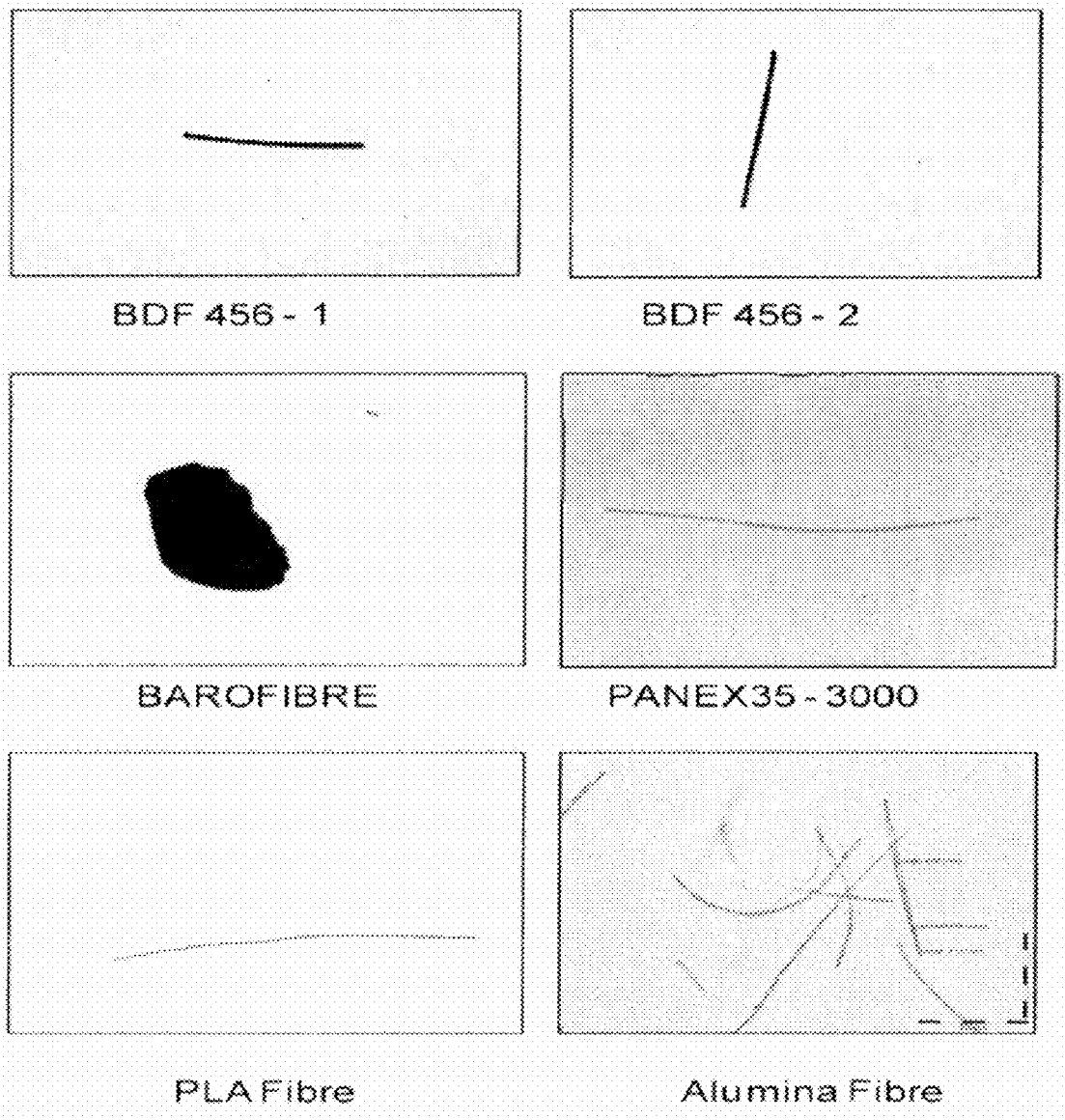
FIG. 6 provides micrographs of some fibers tested herein.

Fiber Characteristics. The properties of the fibers tested in the later examples are included in Table 1. Further, micrographs of some fibers are provided in FIG. 6.

TABLE 1

| Fibers Tested | Material | Specific Gravity | Fiber Length (μm) | Aspect Ratio |
|---|---|---|---|---|
| PANEX ® 32 | PAN | 1.81 | 150 | ~10 |
| PANEX ® 35-0.125" | PAN | 1.81 | 3175 | ~50 |
| PANEX ® 35-0.25" | PAN | 1.81 | 6350 | ~50 |
| PANOX ® | PAN | 1.37 | 300 | ~20 |
| BDF ™ 456-1 | viscose | 1.51 | 3000 | ~20 |
| BDF ™ 456-2 | viscose | 1.51 | 2500 | ~5 |
| BDF ™ 456-3 | viscose | 1.51 | not determined | |
| PLA fibers | poly(lactide) | 1.24 | 3000/1500 | 200/85 |
| alumina fibers | alumina | 3.12 | 200 | 90 |
| BAROFIBRE ® O | cellulosic | 1.1 | 97 | not determined |
| BAROFIBRE ® | cellulosic | 1.1 | 312 | not determined |
| BAROFIBRE ® C | cellulosic | 1.1 | 1063 | ~ |

Wellbore Strengthening Fluids. The Plug Break Pressure (PBP) was measured for a variety of particles and particle/fiber combinations (Table 3). Samples of particles and/or fibers were prepared in drilling fluid HYDROGAURD® (aqueous-based drilling fluid, available from Halliburton Energy Services, Inc.) in concentrations according to Table 3. HYDROGAURD® was prepared according to the composition of Table 2. The samples were tested via the Plug Breaking Pressure Test and the fluid loss to the plug formation was recorded as well as the plug breaking pressure (PBP). It should be noted that the tests were stopped at 2100 psi total pressure, if reached, for safety concerns.

TABLE 2

| Product | Concentration (PPB) |
|---|---|
| Barite | as required |
| NaCl | as required |
| BARAZAN ® D PLUS (powdered xanthan gum polymer) | 1 |
| NaOH | 0.25 |
| PAC ™ R (filtration control agent) | 0.15 |
| CLAY GRABBER ® (shale stabilizer) | 0.5 |
| CLAY SYNC ™ (non-ionic shale stabilizer) | 2 |
| GEM ™ CP (shale stabilizer) | 5 |
| N DRIL ® HT PLUS (crosslinked starch) | 3 |

* All trademark product are available from Halliburton Energy Services, Inc.

TABLE 3

| Sample | D(50) (μm) | Relative Conc. | Conc. (PPB) | Fluid Loss (mL) | PBP (psi) |
|---|---|---|---|---|---|
| BARACARB ® 1200 | 943 | 100/0 | | no control | n/a |
| BARACARB ® 1200 STEELSEAL ® 400 | 847 | 80/20 | 50/8.2 | 70 | 900 |
| BARACARB ® 1200 STEELSEAL ® 1000 | 956 | 80/20 | 50/8.2 | 90 | 900 |
| BARACARB ® 600 STEELSEAL ® 1000 | 777 | 80/20 | 50/8.2 | 80 | 900 |
| WALL-NUT ® M STEELSEAL ® 400 | 1286 | 80/20 | 20.5/8.2 | 5 | 1000 |
| WALL-NUT ® M STEELSEAL ® 1000 | 1339 | 80/20 | 20.5/8.2 | 10 | 1000 |
| BARACARB ® 1200 BDF ™ 456-1 | 943 | 95/5 | 60/1.8 | no control | n/a |
| BARACARB ® 1200 BDF ™ 456-2 | 943 | 95/5 | 60/1.8 | no control | n/a |
| BARACARB ® 600 BDF ™ 456-1 | 709 | 95/5 | 60/1.8 | no control | n/a |
| BARACARB ® 1200 STEELSEAL ® 400 BDF ™ 456-1 | 823 | 70/20/10 | 44/8.5/3.5 | 10 | 2100** |
| BARACARB ® 1200 STEELSEAL ® 400 BDF 456-2 | 823 | 70/20/10 | 44/8.5/3.5 | 10 | 2100** |
| BARACARB ® 1200 STEELSEAL ® 1000 BDF ™ 456-1 | 990 | 70/20/10 | 44/8.5/3.5 | 25 | 2100** |
| BARACARB ® 1200 STEELSEAL ® 1000 BDF ™ 456-2 | 990 | 70/20/10 | 44/8.5/3.5 | 40 | 2100** |
| BARACARB ® 1200 STEELSEAL ® 400 PANEX ® 35-3000 | 842 | 79/20/1 | 49/8.2/0.5 | 15 | 2100** |
| BARACARB ® 1200 STEELSEAL ® 1000 PLA fibers | 986 | 79/20/1 | 49/8.2/0.5 | 30 | 2100** |
| BARACARB ® 1200 STEELSEAL ® 1000 alumina fibers | 986 | 79/20/1 | 49/8.2/0.5 | 40 | 2100** |
| BARACARB ® 1200 STEELSEAL ® 1000 PANEX ® 35-3000 | 986 | 79/20/1 | 49/8.2/0.5 | 25 | 2100** |
| BARACARB ® 1200 STEELSEAL ® 1000 BAROFIBRE ® C | 994 | 65/20/15 | 41/8.2/4 | 40 | 2100** |
| BARACARB ® 1200 STEELSEAL ® 400 BAROFIBRE ® C | 818 | 65/20/15 | 41/8.2/4 | 10 | 2100** |

**Plug did not break up to 2100 psi. Test was stopped at 2100 psi for safety concerns.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method of wellbore strengthening, the method comprising:
providing a wellbore strengthening fluid comprising a drilling fluid, a particulate, and a fiber, wherein the fiber has an aspect ratio of greater than about 5 and a length of about 2500 microns to about 6000 microns;
introducing the wellbore strengthening fluid into a wellbore penetrating a subterranean formation; and
forming a plug comprising the particulate and the fiber in a void near the wellbore, the plug being capable of maintaining integrity at about 1000 psi or greater overbalance pressure.

2. The method of claim 1, wherein the fiber has an aspect ratio of greater than about 25.

3. The method of claim 1, wherein the fiber is present in the wellbore strengthening fluid in an amount ranging from about 0.1 to about 10 pounds per barrel of drilling fluid.

4. The method of claim 1, wherein the drilling fluid comprises a fluid selected from the group consisting of an aqueous-based fluid, an oil-based fluid, an oil-in-water emulsion, and a water-in-oil emulsion.

5. The method of claim 1, wherein the wellbore strengthening fluid further comprises an additive selected from the group consisting of a salt, a weighting agent, an inert solid, a fluid loss control agent, an emulsifier, a dispersion aid, a corrosion inhibitor, an emulsion thinner, an emulsion thickener, a viscosifying agent, a high-pressure high-temperature emulsifier-filtration control agent, a surfactant, a particulate, a proppant, a lost circulation material, a foaming agent, a gas, a pH control additive, a breaker, a biocide, a crosslinker, a stabilizer, a chelating agent, a scale inhibitor, a mutual solvent, an oxidizer, a reducer, a friction reducer, a clay stabilizing agent, and any combination thereof.

6. The method of claim 1, wherein the drilling fluid comprises an oleaginous continuous phase and a polar organic molecule.

7. A method of wellbore strengthening, the method comprising:
providing a wellbore strengthening fluid comprising a drilling fluid, a particulate, and a fiber, wherein the drilling fluid comprises an oleaginous continuous phase and a polar organic molecule;
and wherein the fiber has a length of about 2500 microns to about 6000 microns;
introducing the wellbore strengthening fluid into a wellbore penetrating a subterranean formation; and
forming a plug comprising the particulate and the fiber in a void near the wellbore, the plug being capable of maintaining integrity at about 1000 psi or greater overbalance pressure.

\* \* \* \* \*